United States Patent [19]

Boyce

[11] 4,214,196
[45] Jul. 22, 1980

[54] ENERGY CONTROLLER FOR CONVERSION FROM A DIRECT CURRENT SOURCE TO A VARIABLE FREQUENCY LOAD

[75] Inventor: Jay Boyce, Anaheim, Calif.

[73] Assignee: Jay Boyce & Associates, Anaheim, Calif.

[21] Appl. No.: 933,656

[22] Filed: Aug. 14, 1978

[51] Int. Cl.² .......................... H02P 7/42; H02P 7/64
[52] U.S. Cl. .................................. 318/811; 318/510; 318/512
[58] Field of Search ............... 318/801, 807, 810, 811, 318/812, 510, 512, 513, 341, 345 G; 363/130, 138, 124, 135

[56] References Cited

U.S. PATENT DOCUMENTS

| 3,351,841 | 11/1967 | Lipman et al. | 363/124 |
| 3,406,325 | 10/1968 | Rosa | 318/807 |
| 3,891,913 | 6/1975 | Rao et al. | 363/135 |
| 4,128,793 | 12/1978 | Stich | 318/808 |

Primary Examiner—David Smith, Jr.
Attorney, Agent, or Firm—Willie Krawitz

[57] ABSTRACT

A turn off circuit for a multiphase motor is provided comprising a DC powered system including a three element core having a control core element and an inner and outer core element coupled thereto.

A series of capacitors are coupled to the central core winding to produce suitably shaped pulses to turn off positively and negatively biased SCRs which control power switching SCRs.

A control system is provided to produce a variable pulse frequency and pulse width to a power circuit which sequentially fires and admits the battery power to the motor.

12 Claims, 4 Drawing Figures

ENERGY CONTROLLER FOR CONVERSION FROM A DIRECT CURRENT SOURCE TO A VARIABLE FREQUENCY LOAD

BACKGROUND OF THE INVENTION

This invention relates to a new and improved turn off circuit for a multiphase motor, and more specifically, to a circuit adapted to sequentially turn off positively and negatively biased SCRs, and to a control system therefor. The invention is suitable for use in diverse applications such as AC powered vehicles, stationary motors etc., and the DC energy may be supplied by storage batteries, fuel cells, solar cells, thermoelectric cells, etc. Variable speed motors of multiphase configuration such as squirrel cage, wound rotor, synchronous, linear or commutatorless DC motors and the like may utilize the turn off circuit of this invention.

A wide variety of turn off circuits are known, and some are discussed in the text, "Principles of Inverter Circuits," by B. D. Bedford and R. G. Hoft, 1964, by John Wiley & Sons, Inc. Some problems of turn off and commutation circuits include the large amount of trapped circulating current and energy which impairs performance, counter rotating harmonics, etc. It is also important to be able to feed back energy to the DC source without undue energy losses and without adversely affecting the circuit components. Furthermore, a linear power output to the motor should be provided both at low and high speeds; "cogging" at low speed should be avoided.

Overall, highly uniform turn off pulses are necessary in the case of battery powered vehicles since they are operated under a wide variety of conditions; hence, SCRs are frequently used since they have the capability for high speed switching at relatively high loads. However, because of their turn off characteristics, special means must be taken to ensure they are properly turned off without unduly complicating the circuitry or impairing their performance.

THE INVENTION

According to the invention, a forced turn off circuit is provided for a multiphase motor, comprising a three core, DC powered transformer having a central winding and outer windings coupled thereto. A series of capacitors are coupled to the central winding to provide suitably shaped turn off pulses to positively and negatively biased SCRs which sequentially fire and produce a suitable frequency and pulse width to the motor.

The use of the three core transformer of this invention, together with the capacitors coupled to the central winding, provides a trapezoidal wave shape to the SCR operated turn off signal. Usually, when a capacitor is employed to turn off an SCR, pulse oscillation occurs, and in addition, the "on" period of a pulse may be below the time required to turn off the SCR. However, When employing the transformer core and capacitor coupled control winding, the turn off pulses to the SCRs are converted from a sharp spike to one having trapezoidal shape of about 50 microseconds; this produces uniform pulses suitable for uniform and stable turn off. Only minor circuitry additions are necessary to reduce pulse oscillations and RF transients, reset the transformer hysteresis, and provide an energy trap for surge currents.

DESCRIPTION OF THE PREFERRED EMBODIMENT

Figure 1:
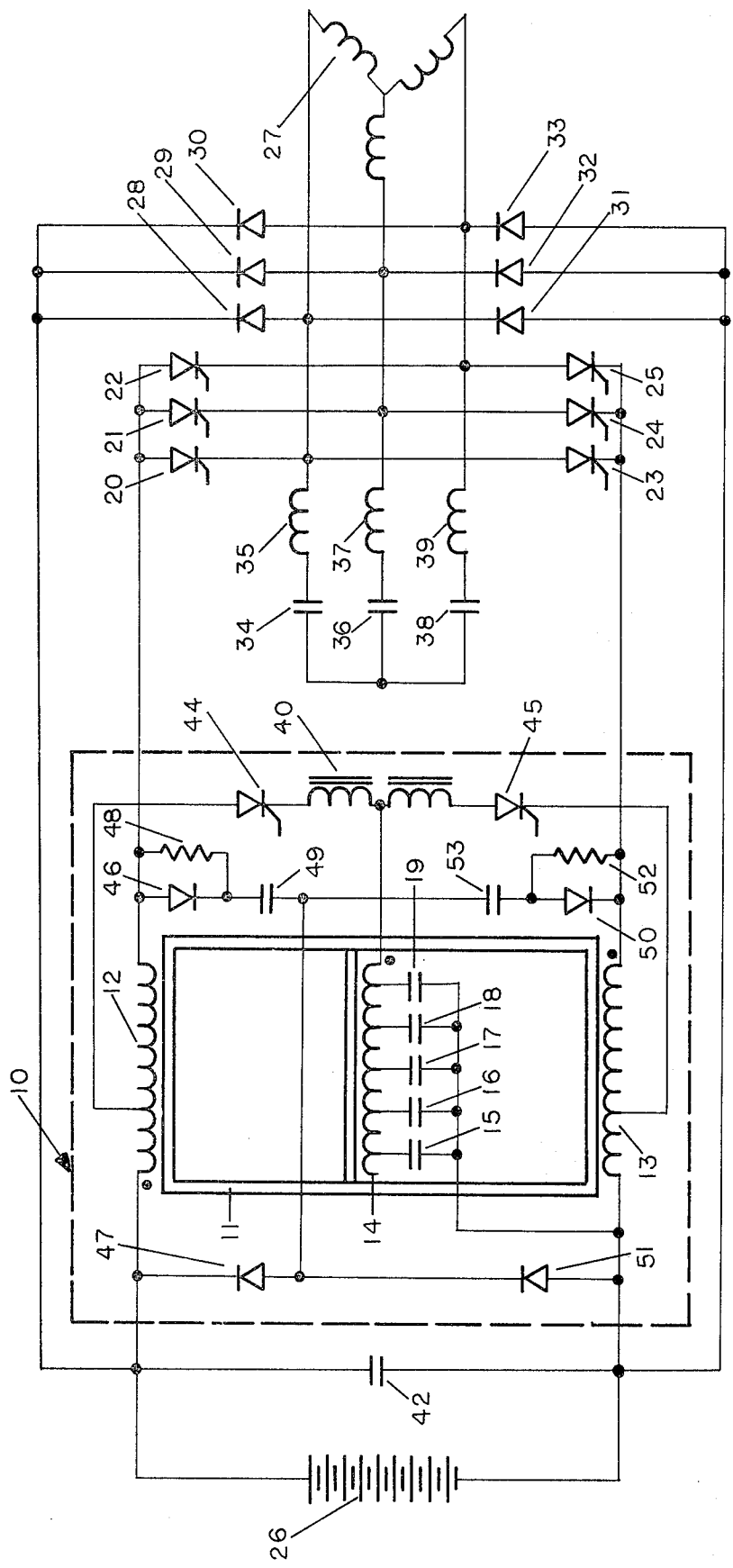
FIGS. 1 and 2 are circuit diagrams of various embodiments of the transformer core and turn off circuit of this invention.

A preferred form of the turn off circuit 10 is shown in FIG. 1 and comprises a transformer core element 11 having loosely coupled outer windings 12, 13 and a central winding 14 coupled to the outer windings; the windings 12, 13 and 14 typically have an inductance of about 100 micro henries for a supply voltage of about 100 volts for operating a 7.5 HP three-phase star motor. Capacitors 15, 16, 17, 18 and 19 (all 30 micro farads) are coupled to the central winding 14, and together, they provide the basic pulse forming network for turning off the SCRs.

Positively biased power SCRs 20, 21 and 22 (International Rectifier 151 RF 40), and negatively biased power SCRs 23, 24 and 25 (also 151 RF 40) are employed to sequentially turn off the current from a battery 26 to a three phase motor 27. The turn off sequence for the SCRs is 20, 25, 21, 23, 22 and 24; the sequencing control for the SCRs is supplied from a control circuit, described infra. Diodes 28, 29, 30, 31, 32 and 33 enable surge currents to be returned to the battery.

Capacitor-inductance pairs 34 and 35; 36 and 37; 38 and 39; are employed as smoothing filters to reduce the possibility of dv/dt firing. An alternative embodiment of the turn off circuit may include a smoothing choke 40 and capacitor 42 as an energy trap, both the choke and capacitor functioning to reduce di/dt firing of SCRs 44, 45 (International Rectifier 71 RC 40).

SCRs 44, 45 are provided to turn off the positive and negative biased SCRs respectively in alternate sequence and 180° out of phase. Control for firing the SCRs 44, 45 is also supplied by the control circuit.

If desired, diodes 46 and 47, resistance 48, and capacitor 49 on the positive side of the core, and corresponding diodes 50 and 51, resistance 52 and capacitor 53 on the negative side of the core may be used to reduce trailing pulse oscillations and positive or negative pulse overshoot from the capacitors 15–19 to the power SCRs. The trapped energy remaining in winding 12 when the power carrying SCRs are blocked, results in a voltage increase at the down stream end. Diodes 46 and 47, and capacitor 49 permit the inductance in winding 12 to decay and transfer the energy to the capacitor 49. Any overcharge of the capacitor is returned to the winding 12 through resistance 48 in the opposite direction to reset the core hysteresis. A similar transfer of energy occurs in winding 13, diodes 50 and 51, resistance 52 and capacitor 53.

Figure 2:
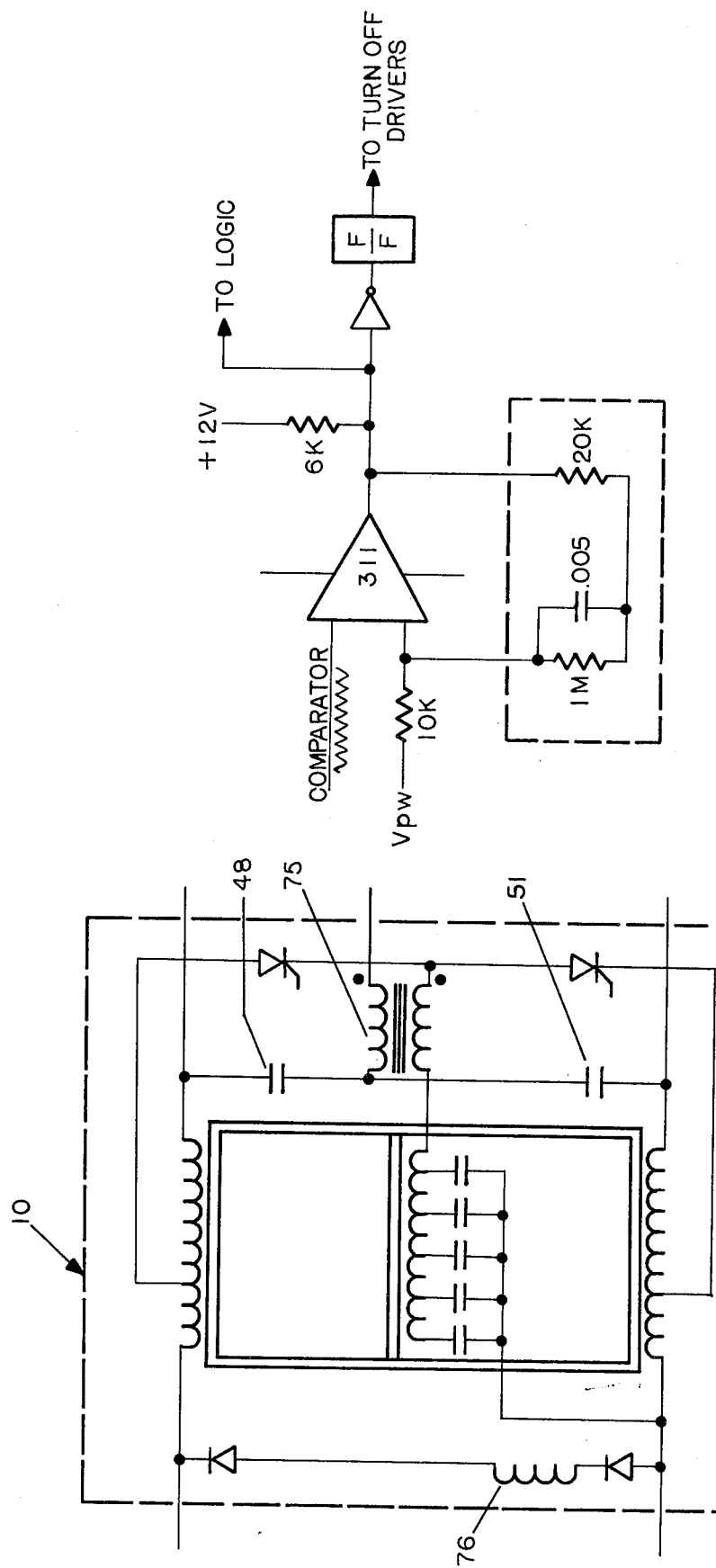

FIG. 2 illustrates another form of a choke 75 employed to enhance the turn off of the SCRs and the transfer of energy from capacitors 49, 53 to the capacitor-inductance paires 34 and 35; 36 and 37; 38 and 39. Alternatively, the choke 75 may be incorporated as part of the central winding 14. If desired, a winding 76 may be employed as an energy trap for return to the battery.

Figure 3:
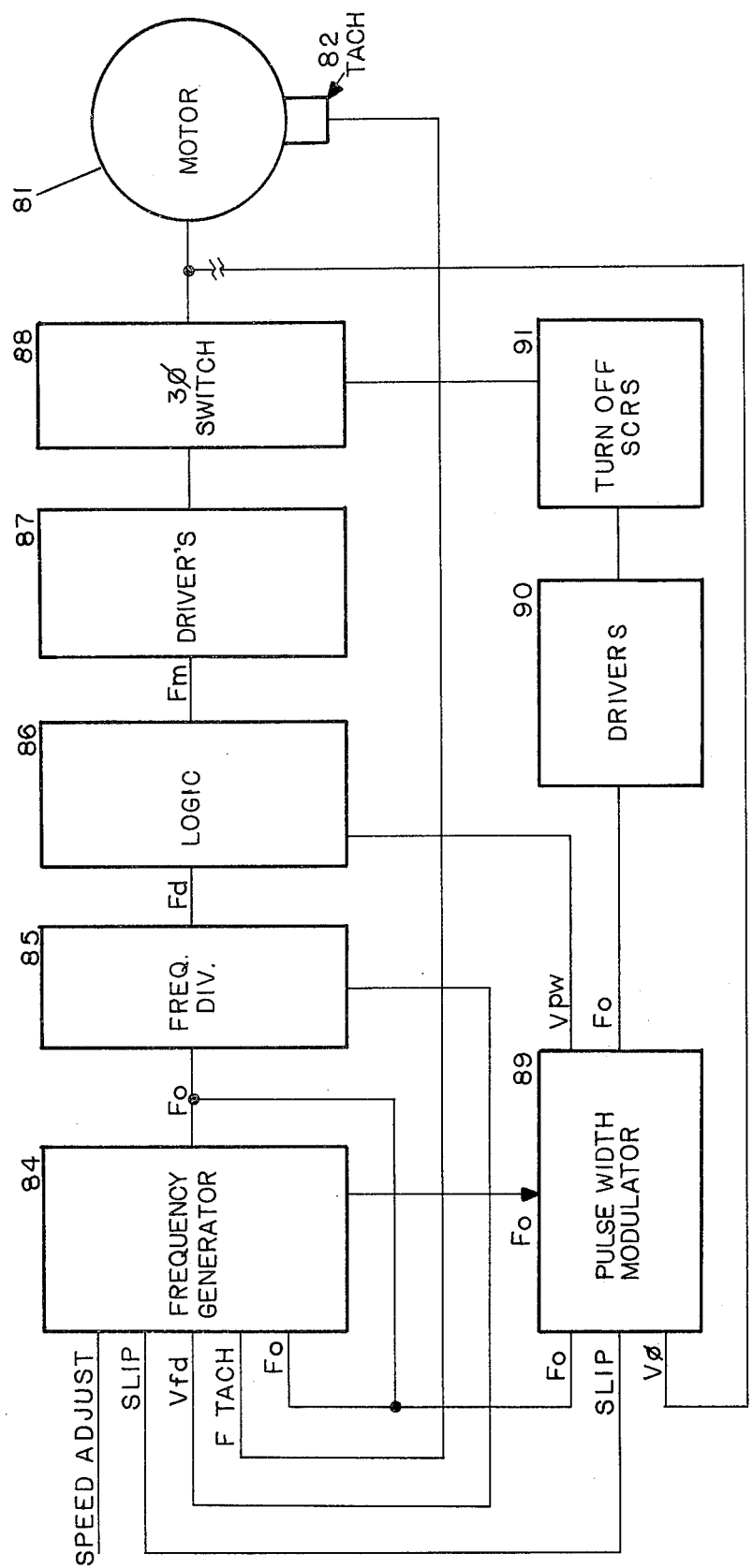
FIG. 3 is a block diagram of the entire system including the turn off circuit; and, FIG. 4 is a circuit diagram of a comparator circuit with a feedback network for reliable switching.

A block diagram of the system is illustrated in FIG. 3. The desired motor speed, determined by the speed control set point, along with the actual speed of the motor 81 as determined by a tachometer 82 and the frequency are fed into a frequency generator 84. When the difference between a signal proportional to the frequency (generated by an oscillator) and tachometer frequency, i.e. the slip frequency, is zero for example, the output will be constant. When the frequency proportional to oscillator frequency exceeds the tachometer frequency, the slip frequency will be increased until the output becomes some maximum value. Similarly, when the tachometer frequency exceeds the oscillator frequency, the slip frequency is decreased until it becomes a negative maximum.

Information from the frequency generator is fed to a frequency divider 85 (for reducing saturation at low speeds) and then to a logic unit 86 which sequences turn on of the SCRs 20-25 and delays turn on times of the SCRs 44, 45. The difference between the time of turn on of SCRs 20-25 and the time of turn on of SCRs 44, 45 will determine the pulse width and hence voltage control. Driver circuit 87 amplifies the logic signals to operating levels prior to feeding to the three phase power switch 88.

A pulse width modulator 89 receives information on oscillator frequency converted to voltage, slip and voltage proportional to AC voltage delivered to the motor and determines optimum pulse width times (i.e. voltage) for the motor. For example, slow motor speeds require a shorter pulse width to prevent motor saturation; also, depending on motor speeds, frequency shifting is employed to reduce "cogging" at low speeds and to avoid harmonics. The pulse width modulation information is then fed to a 180° flip flop for control of amplifier drivers 90 and a turn off control 91 including the SCRs 44, 45.

Referring to FIG. 1, since outer winding 12 and central winding 14 are wound on a common magnetic core, a positive pulse in winding 12 induces a voltage in winding 14 in a direction and magnitude to reduce the current flow in the positive load carrying SCRs 20, 21 and 22 to zero for a time greater than the design blocking time. Similarly, a negative pulse in winding 13 induces a voltage in winding 14 to reduce the current in SCRs 23, 24 and 25 to zero.

Winding 14 and capacitors 15-19 comprise a network which forms a trapezoidal pulse of sufficient duration to turn off the SCRs when connected to a positive voltage source through SCR 44 and again when the capacitors 15-19 discharge into winding 14 when connected to a negative voltage through SCR 45. If desired, to reduce negative overshoot, the core element may be provided with high coercive inserts in the outer air gap space of the outer windings. Additionally, the core at its central winding may be filled with a high permeability material to complete the core structure.

FIG. 6 shows a preferred comparator turn off circuit (employing an operational amplifier) which provides an excellent switching function; the portion of the circuit in dotted designation is employed to provide a stable feedback.

The turn off circuit of this invention achieves many advantages such as frequency and voltage control using a single three winding choke core and two connecting SCRs. The range of frequency operation is greater than 30:1 at the motor while requiring less than a 10:1 range of oscillator frequency. Counter rotating fields associated with harmonics are reduced and this improves torque output and reduces heating in the motor windings. Also, turn off energy is retained in the turn off capacitors after positive turn off and used to energize negative turnoff, the excess being returned to the battery.

I claim:

1. A turn-off circuit for a multiphase motor comprising a DC powered three element core transformer including:
   i. a central core element having a winding thereon;
   ii. outer core elements bearing loosely coupled positive and negative windings, thereby reducing rf transients, the central and outer windings being closely coupled, thereby enhancing pulse generation;
   iii. a plurality of parallel connected capacitors coupled to the central winding to fire simultaneously and thereby provide uniform and suitably shaped trapezoidal turn off pulses; and,
   iv. positively and negatively biased turn off SCRs to sequentially fire and admit the turn off pulses to the central winding for switching DC power from the motor.

2. A control system and turn off circuit for a multiphase motor driven from a DC supply comprising a speed control; a frequency generator; a plurality of power SCRs for switching the DC supply to the motor, the frequency output being adapted to control actual motor speed by means of the power SCRs; a logic circuit for sequencing power switching of the SCRs and on off times of turn off SCRs; a pulse width modulator for applying an optimum pulse width to the motor in response to voltage, frequency slip and voltage delivered to the motor, the pulse width controlling the on off SCRs; and, a DC powered three element core transformer including: a central core element having a winding thereon; outer core elements having loosely coupled positive and negative windings, thereby reducing rf transients; the central and outer windings being closely coupled, thereby enhancing pulse generation; and, a plurality of parallel connected capacitors coupled to the central winding to fire simultaneously and thereby provide uniform and suitably shaped trapezoidal pulses to turn off the SCRs and admit the turn off pulses to the central winding for switching DC power from the motor.

3. The control system of claim 2 in which the turn off circuit provides a first circuit including a shunted diode and capacitor in series connected to the positive outer winding through a diode, and a second circuit provides a corresponding shunted diode and capacitor in series connected through a diode to the negative outer winding, the first and second circuits being connected in series by their respective capacitors.

4. The control system of claim 2 in which the turn off circuit comprises first and second circuits including a capacitor connected to the outer winding at one end and through a diode to the outer winding at its other end, and a choke connected to the midpoint of the capacitors and a smoothing circuit for transferring energy from anode to cathode of the switching SCRs.

5. The control system of claim 2 comprising a comparator turn off circuit including an operational amplifier and feedback therefor, the feedback including an RC network filter, the capacitance being shunted by a resistance.

6. The turn off circuit of claims 1 or 2 in which the turn off pulse has a duration of about 50 microseconds.

7. A turn off circuit for a pulse generator having rf inhibiting chokes which comprises a three element core transformer including:
  i. a central core element having a winding thereon;
  ii. outer core elements bearing loosely coupled positive and negative windings, thereby reducing rf transients; the central element windings and outer element windings being closely coupled for improving pulse generation;
  iii. a plurality of parallel connected capacitors coupled to the central winding to fire simultaneously and thereby provide uniform and suitably shaped trapezoidal pulses; and,
  iv. positively and negatively biased SCRs to sequentially fire and admit the pulses to the central winding.

8. The turn off circuit of claims 1 or 7 comprising two rf inhibiting chokes; a pulse generator; activating SCRs; and, a three element core, having a first outer winding connected to a positive bus; a second outer winding connected to a negative bus, the outer windings being loosely coupled; and a central winding closely coupled to the outer windings; rf inhibiting choke action being provided by the outer windings, and enhanced pulse generation being provided by the central windings; the central winding being connected between a pair of positively and negatively biased turn on SCRs; and, a plurality of capacitors coupled in parallel to the central winding and to the rf inhibiting choke to fire simultaneously and thereby produce uniform and suitably shaped trapezoidal turn off pulses.

9. The turn off circuit of claim 1 or 7 providing a first circuit including a shunted diode and capacitor in series connected to the positive outer winding through a diode, and a second circuit providing a corresponding shunted diode and capacitor in series connected through a diode to the negative outer winding, the first and second circuits being connected in series by their respective capacitors.

10. The turn off circuit of claim 1 or 7 comprising first and second circuits including a capacitor connected to the outer winding at one end and through a diode to the outer winding at its other end, and a choke connected to the midpoint of the capacitors and a smoothing circuit for transferring energy from anode to cathode of a switching SCR.

11. The turn off circuit of claim 1 or 7 comprising first and second circuits including a capacitor connected to the outer winding at one end and through a diode to the outer winding at its other end, and a choke connected to the midpoint of the capacitors nad a smoothing circuit for transferring energy from anode to cathode of a switching SCR, the turn off circuit providing loosely coupled outer windings and closely coupled central and outer windings, thereby reducing RF transients.

12. The turn off circuit of claim 1 or 7 providing a first circuit including a shunted diode and capacitor in series connected to the positive outer winding through a diode, and a second circuit providing a corresponding shunted diode and capacitor in series connected through a diode to the negative outer winding, the first and second circuits being connected in series by their respective capacitors, the outer windings being loosely coupled and the central and outer windings being closely coupled.

* * * * *